United States Patent
Angelin et al.

(10) Patent No.: US 9,413,247 B2
(45) Date of Patent: Aug. 9, 2016

(54) SIGNAL TRANSMISSION METHOD AND RELATED DEVICE

(71) Applicant: OSRAM GmbH, Munich (DE)

(72) Inventors: Francesco Angelin, Mogliano Veneto (IT); Filippo Branchetti, Treviso (IT)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 14/327,579

(22) Filed: Jul. 10, 2014

(65) Prior Publication Data

US 2015/0015156 A1     Jan. 15, 2015

(30) Foreign Application Priority Data

Jul. 10, 2013    (IT) .............................. TO2013A0579

(51) Int. Cl.
     *H05B 37/02*      (2006.01)
     *H02M 3/335*      (2006.01)
     *H05B 33/08*      (2006.01)

(52) U.S. Cl.
     CPC ...... *H02M 3/33507* (2013.01); *H02M 3/33523* (2013.01); *H05B 33/0815* (2013.01); *H05B 33/0851* (2013.01); *Y02B 20/346* (2013.01); *Y02B 70/1483* (2013.01)

(58) Field of Classification Search
     CPC ..................................................... H05B 33/08
     USPC ...... 315/291, 294, 295, 308, 185 R, 312, 210
     See application file for complete search history.

(56) References Cited

U.S. PATENT DOCUMENTS

| | | | |
|---|---|---|---|
| 2005/0105305 A1 | 5/2005 | Sawada et al. | |
| 2007/0164720 A1* | 7/2007 | Lalithambika | H02M 3/33507 323/288 |
| 2011/0227506 A1* | 9/2011 | Ren | H02M 3/33507 315/307 |
| 2012/0068614 A1 | 3/2012 | Ng et al. | |
| 2012/0280151 A1* | 11/2012 | Pion | H03F 3/085 250/551 |
| 2013/0107584 A1* | 5/2013 | Li | H02M 1/08 363/21.12 |
| 2013/0107585 A1* | 5/2013 | Sims | H02M 3/33592 363/21.14 |
| 2013/0113381 A1* | 5/2013 | Cai | H05B 33/0815 315/122 |

FOREIGN PATENT DOCUMENTS

CN        1606395 A      4/2005
CN    102832817 A    12/2012

OTHER PUBLICATIONS

Search Report issued in the corresponding Italian application No. TO20130579, dated Apr. 23, 2014.
Chinese Office Action based on Application No. 201410329483.X(6 Pages) dated Dec. 24, 2015 (Reference Purpose Only).

* cited by examiner

*Primary Examiner* — Minh D A
(74) *Attorney, Agent, or Firm* — Viering, Jentschura & Partner mbB

(57) ABSTRACT

A method of operating an electrical power supply device having a primary side and a secondary side is provided. The method includes transmitting with an optocoupler arranged between the primary side and the secondary side a wide band control signal and a numerical information signal. The method further includes transmitting the control signal and the information signal over a rectangular-wave signal modulated in combination with frequency modulation and pulse width modulation. The control signal and the information signal are the modulating signals for frequency modulation and pulse width modulation of said rectangular-wave signal.

8 Claims, 2 Drawing Sheets

SIGNAL TRANSMISSION METHOD AND RELATED DEVICE

CROSS-REFERENCE TO RELATED APPLICATION

This application claims priority to Italian Patent Application Serial No. TO 2013 A 000579, which was filed Jul. 10, 2013, and is incorporated herein by reference in its entirety.

TECHNICAL FIELD

Various embodiments relate generally to signal transmission techniques.

One or more embodiments may find application in power supply units, e.g. switching power supply units, for lighting sources.

BACKGROUND

Various arrangements of supply units for lighting devices, for example solid-state lighting devices such as devices using LED sources as light radiation sources, may resort to switching topologies. This may be implemented, for example, in insulated power supply arrangements known as Power Supply Units (PSUs).

In high-end applications, both the primary and the secondary side of the PSU may include a microcontroller, with the need to exchange information across the insulation bather between primary side and secondary side.

Passing information may involve critical aspects, for example if performance-limited optocouplers are used.

In various implementations, the information exchange between primary and secondary side may include, in addition to a low-speed bidirectional data exchange (adapted to pass numerical information concerning slow-changing parameters), a wide-bandwidth channel adapted to transmit a high-speed signal which is used for control functions, which is able for example to provide the primary side with a feedback signal from the secondary side output, in order to close the regulation loop.

Considering by way of example the transmission going from the secondary to the primary side, the need may arise to transmit two types of information across the insulation bather:
quasi-static parameters (for instance various setting points, temperatures, system states and so on) which must be transmitted through slowly-changing signals, which do not require a high transmission speed, and
a wide-bandwidth signal, which is needed to close the regulation loop and achieve proper electrical values at the PSU output.

Various implementations based on the use of optocouplers may comply with two basic arrangements.

A first arrangement involves the separation of an analog feedback from a digital data communication. Such an architecture may require two different optocouplers operating from the secondary to the primary side: one operating in a digital way, the other transmitting a linear current, so as to fully employ the small-signal bandwidth of the optocoupler.

This solution may involve both advantages and disadvantages:
the bilateral digital data exchange may be based on standard low-speed optocouplers, adapted to be driven and decoded by standard UART (Universal Asynchronous Receiver Transmitter) peripherals, which are available also on low-cost microcontrollers;
as previously mentioned, in order to transmit from the secondary to the primary side it may be necessary to use two optocouplers, and this may double costs and the space needed on the PCB (Printed Circuit Board) compared to solutions employing only one optocoupler;
the optocoupler acting on the analog signal may be affected by a remarkable variability of its Current Transmission Ratio (CRT).

Some implementations may involve the creation of a high-speed serial channel from the secondary to the primary side, with the following consequences:
only one optocoupler may be used (from the secondary side to the primary side);
such a fast coupler may be costly, power consuming and physically bigger compared to standard optocouplers; it is a component which is not easily available as a fast device adapted to operate at high insulation voltages;
due to the use of a standard asynchronous protocol, both communicating microcontrollers must be fitted with high data-rate UARTs, which are rarely available inside low-cost ICs; moreover, the serial codec process causes a notable CPU overhead;
such a high data-rate communication normally suffers from the noise generated by the switching electronics of the power section. High-speed signals are often affected by power switching proximity and self-disturbance events.

SUMMARY

A method of operating an electrical power supply device having a primary side and a secondary side is provided. The method includes transmitting with an optocoupler arranged between the primary side and the secondary side a wide band control signal and a numerical information signal. The method further includes transmitting the control signal and the information signal over a rectangular-wave signal modulated in combination with frequency modulation and pulse width modulation. The control signal and the information signal are the modulating signals for frequency modulation and pulse width modulation of said rectangular-wave signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
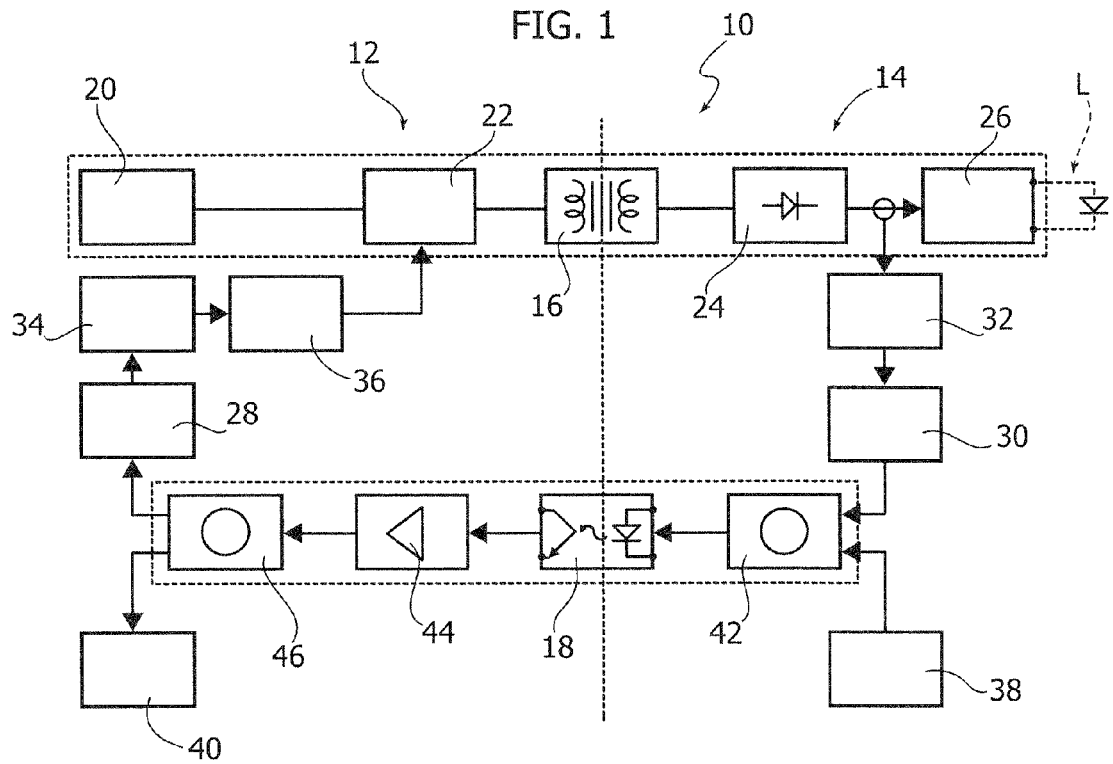
FIG. 1 shows a block diagram of a supply device adapted to include various embodiments.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

In the following description, numerous specific details are given to provide a thorough understanding of various exemplary embodiments. One or more embodiments may be practiced without one or several specific details, or with other methods, components, materials, etc. In other instances, well-known structures, materials, or operations are not shown or described in detail to avoid obscuring aspects of the embodiments. Reference throughout this specification to "one or more embodiments" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The reference signs provided herein are for convenience only and do not interpret the scope or meaning of the embodiments.

From the above statements the need emerges of solutions which, while preserving the advantages of prior art arrangements, may avoid the related drawbacks, e.g. by offering the possibility to use only one optocoupler in the one-way communication (e.g. from the secondary to the primary side), with the further possibility to use standard optocouplers (i.e. which are not specifically designed to operate at high speed) and/or to use a digital transmission both for quasi-static data and for fast signals (e.g. the wide-band feedback signal); while at the same time avoiding overloading the microcontroller(s) with fast codec routines, and avoiding the provision of microcontrollers with specific peripheral blocks (fast UARTs or special timers).

One or more embodiments aim at satisfying such a requirement.

One or more embodiments achieve this goal thanks to a method having the features specifically set forth in the claims that follow.

One or more embodiments may refer to a related device.

The claims are an integral part of the technical teaching provided herein with reference to the invention.

One or more embodiments may involve the use of a new specific modulation technique to drive an optocoupler.

One or more embodiments may involve the use of an electronic circuit adapted to "speed up" the optocoupler output, thus enabling the optocoupler to reach a data-rate high enough to support the modulation process.

One or more embodiments may provide one or more of the following advantages:

by resorting to a special modulation technique and, if necessary, to the use of a circuit which speeds up the device operation (a so-called "quickener"), it is possible to use a single standard (i.e. not particularly fast) optocoupler to transmit on one and the same channel both an analog feedback signal and a numerical item of information (data);

the Pulse Width Modulation (PWM) digital data transmission is intrinsically immune to noise and to signal distortion, thanks to its "ratiometric" nature; it is moreover possible to omit a synchronization between the clocks of the mutually communicating microcontrollers;

the circuit which speeds up the device performances enables the employment of the whole small-signal bandwidth of the standard optocoupler as the digital bandwidth, thus enabling the transmission of a corresponding modulated signal;

in frequency-controlled power supply topologies, e.g. of a resonant kind, the frequency modulated signal from the insulated secondary side may be used to drive the power stage, either directly or via simple frequency manipulation (dividing/multiplying) techniques.

The diagram in FIG. 1 is an exemplary block diagram of a possible architecture of a power supply device which can be employed to supply a lighting source, such as a LED lighting source.

Such a lighting source, denoted by L, may comprise a single light radiation source or several light radiation sources coupled with one another, according to a LED-string arrangement.

The dashed lines in FIG. 1 highlight the fact that one or more embodiments may refer primarily to supply device 10, to which lighting source L may be coupled only in the final arrangement of use.

Lighting device 10 generally includes a primary side 12 and a secondary side 14, which are separated by a so-called "galvanic" insulation barrier including, in the presently considered embodiment, a transformer 16 (which leads to designating sides 12 and 14 of the device respectively as primary and secondary side, because they are respectively connected to the primary and to the secondary winding of transformer 16) and an opto-coupler 18 adapted to perform a signal transmission from the insulated secondary side 14 to the primary side 12, in the ways that will be better detailed below.

Continuing the description of the exemplary block diagram in FIG. 1, reference 20 denotes a power input adapted to feed the primary side of transformer 16 via a switching circuit 22, e.g. including electronic switches such as MOSFETs, alternately switched on and off.

The secondary winding of transformer 16 feeds a rectifier 24, which in turn drives lighting source L, directly or possibly through a driver stage 26.

Components and circuit elements corresponding to the above described blocks are well-known in the art in a wide range of possible combinations and/or implementing variations; this makes it unnecessary to provide a detailed description herein.

The same is fundamentally true for the possible provision, both on the primary side 12 and on the secondary side 14, of processing devices or modules 28, 30, adapted to perform a control function, for example within a general feedback arrangement. This may take place according to various control strategies known per se, and therefore not requiring a detailed description herein. In one or more embodiments, one or several of the presently shown modules, e.g. modules 28, 34, 40 and 46 for the primary side and modules 32, 30, 38 and 42 for the secondary side, which are presently shown as distinct blocks for clarity, may be implemented as internal functions of a microcontroller.

As far as the present considerations are concerned, it may suffice to recall the fact that in one or more embodiments processing module 30 on the secondary side 14 may receive, e.g. via an analog/digital converter (or equivalent component) 32, a signal representative of the output signal level sent to the lighting source L.

The sensing (tap) point of such a feedback signal is here exemplified as located downstream of rectifier 24, but it may be located in other positions, so as to obtain a signal related to an output value, such as current or voltage.

The feedback signal received by module 30 is sent to the primary side 12, e.g. to module 28 on the primary side 12. In this way, module 28 may drive (e.g. via a module 34 and a driver 36) the switching block 22 producing the signal applied to the primary winding of transformer 16.

For example, module 34 can act on block 22 by controlling the on/off times of the switches contained therein, so as to keep the supply level to source L at desired values (if needed, while implementing a control action on the light emission intensity, a so-called "dimming" function").

Once again, this may take place on the basis of criteria known per se, which do not require a specific description herein.

In one or more embodiments, signal transmission from the secondary side 14 to the primary side 12 (or, in case, reverse transmission, which however may not be required, or may be implemented according to different criteria, e.g. through a low-speed asynchronous channel) may involve the transmission, from the secondary side 14 to the primary side 12, of:

a "fast", i.e. a wide-bandwidth feedback signal, e.g. from module 30 to module 28, a numerical signal, conveying data representative of "quasi-static" parameters (e.g. parameters indicating regulation points, temperatures, system states, etc.), and therefore having a slow evolution in time, e.g. coming from a module 38 and addressed to a module 40 for collection (and in case for signaling/processing).

In one or more embodiments, both the fast feedback analog signal, i.e. the large-bandwidth single, and the "numerical" signal with quasi-static data or information, may be forwarded to a modulator 42 which is adapted to generate, according to criteria better detailed in the following, a composite drive signal for optocoupler 18.

At the output of optocoupler 18, and thus on the primary side 12, in one or more embodiments there may be provided (beside an accelerating circuit or "quickener" 44 which will be better detailed in the following, and the presence of which is however optional) a demodulator 46, adapted to demodulate the composite signal from optocoupler 18 in order to separate the fast, wide-bandwidth component, which will be transmitted to processing module 28, from "quasi-static" signals adapted to be sent to module 40.

In one or more embodiments, modulator 42 (and in a complementary way demodulator 46) may operate according to the criteria illustrated in FIG. 2 to FIG. 5.

The above-mentioned Figures exemplify one or more embodiments in which modulator 42 may generate, in view of sending to optocoupler 18, a signal with rectangular waveform comprising a series of signal intervals (or periods) wherein in each interval or period the signal assumes:

over a first portion of the interval, a first level, e.g. a "low" level, and over a second portion of the interval, a second level, e.g. a "high" level.

In one or more embodiments, modulator 42 may be able to drive (according to criteria known per se) two parameters of the signal with rectangular waveform, i.e.:

frequency, which may be defined e.g. as the reciprocal of the signal period, i.e. of the interval during which the signal assumes the first level and then the second level;

duty-cycle, which may be defined for example as the ratio of the portion of the signal interval wherein the signal assumes e.g. the "high" level and the complete duration of the signal interval (period).

FIG. 2 to FIG. 5 exemplify embodiments wherein the signal may initially assume the "low", and then the "high" level.

This illustration is merely exemplary: the sequence may actually include an initial "high" and a following "low" level, and/or the use of symmetrical or antipodal signals.

Figure 2:
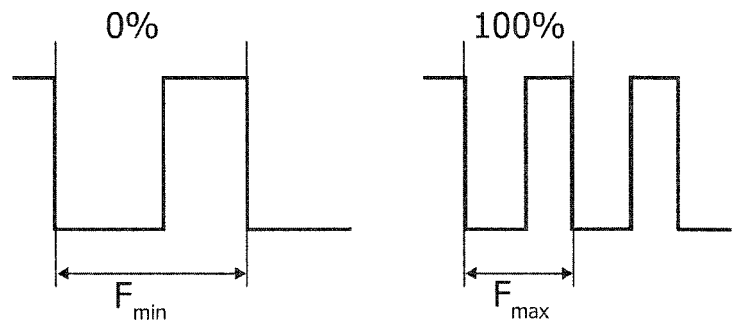
FIGS. 2 to 5 are time graphs of signals illustrating various embodiments.

For example, FIG. 2 exemplifies the possibility to vary the rectangular-wave signal frequency between a minimum frequency value $F_{min}$ (maximum expected duration of the signal interval) and a maximum frequency value $F_{max}$ (minimum duration of the period).

In one or more embodiments, the rectangular-wave signal frequency may be varied over a continuum of frequencies between minimum value $F_{min}$ and maximum value $F_{max}$.

Assuming for instance that the minimum frequency value $F_{min}$ corresponds to 0% and the maximum level to 100% of the intensity of a given signal, modulator 42 may be driven (according to known criteria) so that frequency may vary to correspond in an "analog" way to any value between 0% and 100%, according to the previously defined values of $F_{min}$ and $F_{max}$.

This type of transmission (frequency variation of the rectangular waveform signal) may be used to transmit the wide-bandwidth, i.e. the "fast", feedback signal detected by module 32. In one or more embodiments, modules 30 and/or 32 may even be omitted, because it is at least theoretically possible to provide the corresponding input of modulator 42 with any feedback signal picked on the secondary side 14 of device 10.

Figure 3:
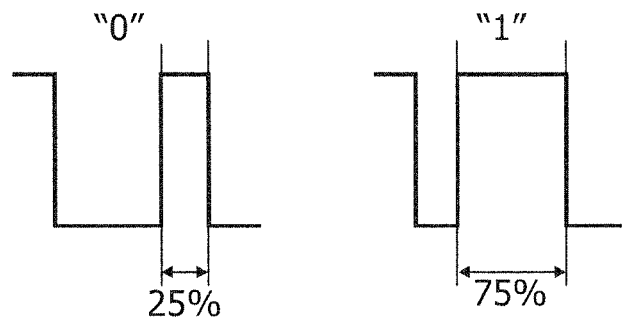

FIG. 3 shows the possibility to vary, within each signal interval of the rectangular wave signal, the duty-cycle, i.e. the duration of the e.g. "high" value as compared with the duration of the e.g. "low" value or to the sum of both.

The left part in FIG. 3 exemplifies a signal which may be identified as a signal with a duty-cycle of 25%, while the right part of the same Figure exemplifies a signal with a duty-cycle of 75%.

In one or more embodiments, the choice of either duty-cycle value may be associated to a numerical item of binary information (e.g. "0" for a 25% duty-cycle and "1" for a 75% duty-cycle).

The experts in the field will appreciate that such a modulation, which substantially resembles a Pulse Width Modulation, PWM, is not in itself limited to the transmission of a single information bit (equal to "0" or to "1") for a given signal interval.

For example, given four possible values of the duty-cycle, it is possible to associate each of these four values to pairs of digital values "00", "01", "10" and "11", which enables the transmission of two information bits per signal interval.

This may take place within what can be substantially defined as an asynchronous serial process, which may lend itself e.g. to the transmission of "quasi-static" signals adapted to pass from module 38 to module 40 in FIG. 1.

As previously stated, in one or more embodiments it is possible to vary the frequency of the rectangular wave signal between two predetermined limit values, in such a way that the lowest frequency corresponds to the minimum value of the feedback signal, and the highest frequency corresponds to the maximum value of the feedback signal.

Being fundamentally a frequency modulation, the transmission is intrinsically robust to noise and immune to width fluctuations of the signal, for example due to the variation in time of the CRT. Moreover, the possibility of a continuous frequency variation adapts perfectly to the transmission of a signal of analog origin. When this signal is an error signal from a feedback processing, there is no need for the frequency of the clocks of both microcontrollers to have a ratio known in advance, the regulator being adapted to adjust said signal until the error is cancelled, and therefore to compensate the whole transmission chain. In one or more embodiments, the reference for frequency counting may be derived on a given rising or falling edge, so that the duty-cycle variation in itself has no influence on the feedback signal transmission.

In one or more embodiments, each period or interval of the rectangular waveform signal may contain the whole item of information regarding the feedback signal, which means that the data rate may be variable as a function of frequency itself. In one or more embodiments, the minimum frequency may therefore be chosen so as to satisfy the minimum bandwidth requirements, while as far as the optocoupler 10 is concerned, an important aspect may be the repeatability of the identification of the reference edge for period determination, i.e. its stability when surrounding parameters and the superimposed PWM modulation vary.

In one or more embodiments, the frequency-modulated signal may come from secondary side 14 as a part of a regulating function loop, and may be used directly to adjust the working point in some frequency-controlled topologies, such as resonant power supplies. In such a case, block 34 may be omitted and block 28 may be reduced to a simple frequency scaling or multiplication.

Figure 4:
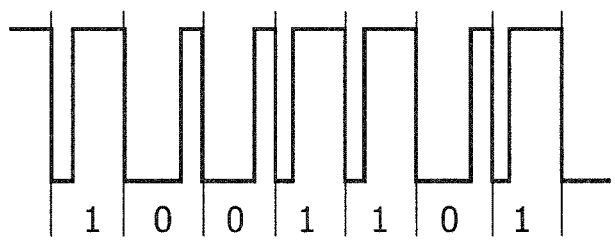
Figure 5:
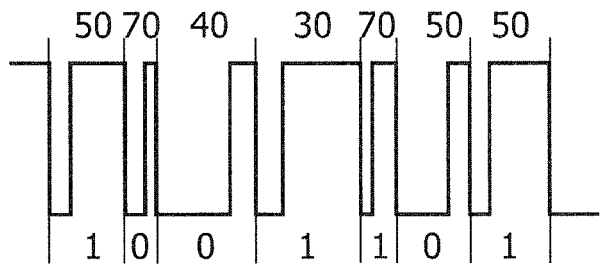

In one or more embodiments, modulator 42 may therefore implement a sort of superimposition of both modulations (frequency and duty-cycle modulations) exemplified in FIG. 2 and FIG. 3, originating signals as exemplified in FIG. 4 and FIG. 5 wherein, in the presence of the same transmitted numerical information (from module 38 to module 40 in the example of FIG. 1), as for example illustrated by the sequence 1001101 in the lower part of the referred Figure, it is possible to generate signals having a variable frequency, so as to express the (fast) variation of the feedback signal.

In this regard, some interesting aspects may be pointed out.

Although it is possible to use higher cardinality alphabets, a simple "0" and "1" alphabet is satisfactory for a wide range of possible transmission requirements for quasi-static signals. In this case, demodulator 46 may resort to a single reading threshold in the duty cycle for symbol recognition.

For example, assuming that the threshold is fixed at 50%, if the received pulse has a duty-cycle within the 0-50% range, this may be decoded as "0", and in the other case (a duty-cycle higher than the threshold) may be decoded as the symbol "1".

This solution is depicted in FIG. 3, wherein a 25% and a 75% duty-cycle pulses are shown.

As stated before, it is also possible to code more than one information bit per signal interval, for example as a function of the signal-to-noise ratio of the reconstructed signal and the distortion introduced by optocoupler 18 and the associated electronics.

We previously made reference to the possibility of coding four symbols ("00", "01", "10" and "11"). On the contrary, by fixing two duty-cycles thresholds, as for example 33% and 66%, it is possible to transmit three different values per signal period.

In one or more embodiments, by using a binary alphabet, for example "0" and "1", a quasi-standard asynchronous communication may be implemented, by associating the "mark" and "space" symbols to the two alphabet binary values. This enables an implementation via a standard UART peripheral together with a PWM timer.

In one or more embodiments, data transmission takes place according to a very robust transmission pattern, especially when a restricted number of symbols is used.

In one or more embodiments, the physical channel implemented by optocoupler 18 may ensure a good repeatability of signal edges and low edge distortion of PWM modulation at the various frequencies set for example by the fast feedback modulation.

In one or more embodiments, in the reconstruction of the "numerical" signal it is possible to use a discrimination principle (for example the 50% threshold), so that possible duty-cycle distortions may be accounted for by ensuring sufficiently wide "assignment ranges" of the alphabet symbols.

In this way, in one or more embodiments, for example using a binary alphabet with "0" and "1", it is possible to implement an intrinsically robust transmission pattern even in the presence of a rather high pulse distortion.

Nevertheless, in one or more embodiments the "analog" signal is not reconstructed by suppressing an error due to distortion, but it is measured directly on either edge, as the edge itself shows a good repeatability (in shape and delay) when the duty-cycle varies or in case of other perturbing factors.

The transmission speed in terms of data rate may be dependent on the superimposed frequency modulation, because for example one symbol is transmitted per signal period or interval. In one or more embodiment, the modulation process may actually generate a rectangular waveform with varying frequency and duty-cycle, as exemplified in FIG. 5, wherein the exemplary numbers are inversely proportional to the duration of the related signal interval (period).

One or more embodiments may involve frequency modulation for the analog signal and PWM modulation for the digital signal. The complementary choice, however, is not excluded from other embodiments.

In one or more embodiments, the physical channel (primarily optocoupler 18) may show a less than ideal behaviour, because components included in the communication channel are prone to distort the signal, by shifting the rising and falling edges depending on working conditions. This fact may be considered as a sort of cross-modulation of both signals, so that each signal may be seen as corrupted by the other. It was observed that it is easier to preserve the frequency by varying the duty-cycle, rather than the opposite, especially if a signal conditioning circuit 44 is used which will be better detailed in the following.

In one or more embodiments, the reconstruction of the PWM signal at demodulator 46 may be based on a discrete quantisation, so that by employing wide ranges of symbol recognition it is possible to perform an effective rejection of cross-modulation.

Moreover, the duty-cycle is intrinsically a ratio of two time values, and therefore is independent from an absolute measure of the signal period or interval; the related asynchronous communication, therefore, may take place in absence of a previously known ratio between the two time bases of transmitter and receiver (modules 42 and 49).

In one or more embodiments, the regulating action performed via the feedback signal obtained on the isolated secondary side 14 (by converter 32 and processing module 30, in the example shown in FIG. 1) may be achieved with a rectangular signal (see FIG. 2 to FIG. 5) with frequencies $F_{min}$, $F_{max}$ having values up to a few tens of kHz.

Optocouplers 18 having an output with low-speed standard transistors, operated at saturation, may have difficulties in reaching such high data rates. This situation can be countered by using as an optocoupler a specific high-speed device in the above mentioned frequency range.

One or more embodiments may deal with the aspect of the data rate in case of standard optocouplers operated in saturation mode (with switching times of about 3 to 10 microseconds) via a signal conditioning circuit ("quickener") 44 adapted to be interposed between the output of optocoupler 18 and demodulator 46.

Figure 6:
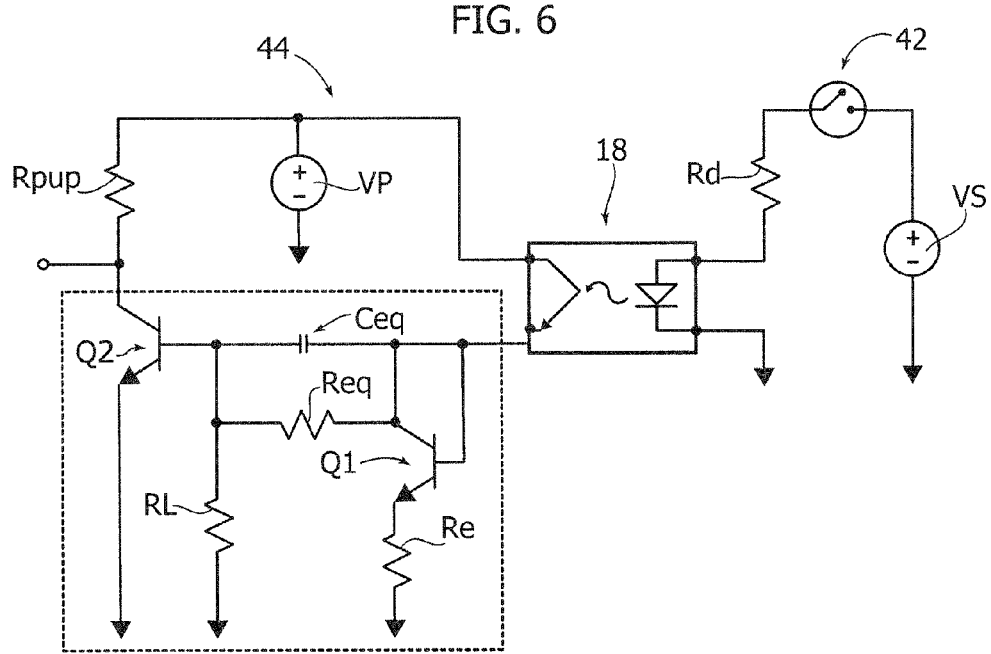
FIG. 6 shows a block diagram showing in more detail a circuit which can be included in various embodiments.

FIG. 6 is a circuit diagram concerning a possible embodiment of such a circuit 44.

In one or more embodiments, such a circuit may make use of the small-signal bandwidth of the optocoupler (which is prone to be quite wide) so as to achieve a module ensuring a bandwidth large enough to satisfactorily deal with the digital signals transmitted in the context of FIG. 1.

In one or more embodiments, circuit 44 may be connected to the output side of optocoupler 18 (i.e., in the presently considered example, located on primary side 12 of supply unit 10).

In the presently depicted example, circuit 44 includes a reduced number of components and is adapted to overcome the limitations in saturation mode and to restore a rectangular waveform until well over 100 kHz (which is the typical small-signal bandwidth which can also be achieved with a standard optocoupler).

In one or more embodiments, circuit 44 may be considered essentially as a frequency-equalized current-mirror, which is adapted to:

counter the saturation of the output transistor of optocoupler 18;

act as a current amplifier, with a voltage squaring output, act as a frequency equalizer, which properly restores the coupler input signal.

In the presently shown example, the current-mirror structure is built around two transistors (for example bipolar-BJT transistors) Q1 and Q2.

In one or more embodiments, transistor Q1 may be connected with its base and collector to the output of optocoupler 18, for example to the emitter of the output transistor of optocoupler 18.

In one or more embodiments, transistor Q1 may act as an active load for the output transistor of optocoupler 18, preventing its saturation by forcing an almost fixed voltage between the emitter and the collector of the receiving element. The Miller effect is largely reduced by forcing an almost constant voltage at the collector-base junction, too.

In one or more embodiments, the minimum value of the primary bias voltage VP of FIG. 6 may be approximately equal to the sum of the pre-saturation voltage plus the base-emitter voltage of transistor Q1, with the addition of the voltage drop on a resistor Re interposed between the emitter of transistor Q1 and ground, which is in the range of some tens of millivolts. In one or more embodiments, the upper limit is set by the power dissipation of the optocoupler. Possible values may be 3.3 V, 5 V or 12 V.

In one or more embodiments, the output of transistor Q1 (i.e. the collector, in the presently considered embodiment) may be connected to a high-pass network RC, comprised of a capacitor Ceq and by a resistor Req and adapted to modify the frequency response of the output amplifier formed by transistor Q2. This aims at equalizing the spectrum, so as to restore the input signal of optocoupler 18 at the output.

Furthermore, it will be appreciated that resistor Req may prevent transistor Q2 from undergoing hard saturation, by limiting its static base current.

In one or more embodiments, high-pass network Ceq, Req may therefore achieve the required data rate, principally thanks to the discharge effect caused by capacitor Ceq on transistor Q2: the injected negative current pulse is able to turn transistor Q2 off very rapidly, recovering from partial saturation in a short time.

In one or more embodiments, at the output of high-pass network Ceq, Req (for example between the base of transistor Q2 and ground), a resistor RL may be interposed in order to act as a minimum load for the receiving side of the optocoupler, so as to prevent its off-current from switching transistor Q2 on, while helping to switch it off in normal operation.

In one or more embodiments, a pull-up resistor Rpup is connected to the primary bias voltage BP and linked to the collector of transistor Q2 (adapted to implement the output of circuit 44, while the emitter of the same transistor Q2 may be connected to ground).

In one or more embodiments, the output signal of circuit 44 is a delayed copy of the input signal received by optocoupler 18. In one or more embodiments, the delay may be in the order of one microsecond.

In one or more embodiments, transistors Q1 and Q2 may be chosen as a matched pair, in order to optimize the performances of the current-mirror.

The experts in the field will appreciate that the circuit shown in FIG. 6 is merely exemplary.

For example, in one or more embodiments, it is possible to reverse the polarity of transistors Q1, Q2, while correspondingly reversing the connection at the output of optocoupler 18.

To complete the illustration, the diagram in FIG. 6 also exemplifies the presence of modulator 42, which is generally denoted by the symbol of a switch in order to indicate the wide range of implementation solutions (known per se) on the basis of the criteria stated above.

To further complete the illustration, the diagram in FIG. 6 also exemplifies a secondary bias voltage VS supplying the input side (LED) of optocoupler 18 via a biasing resistor Rd.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An electrical power supply device, comprising:
    a primary side;
    a secondary side; and
    an optocoupler arranged between the primary side and the secondary side;
    a modulator/demodulator pair configured to transmit and receive a rectangular-wave signal modulated in combination with frequency modulation and pulse width modulation according to a method of operating an electrical power supply device having a primary side and a secondary side, the method comprising:
        transmitting with an optocoupler arranged between said primary side and said secondary side:
            a wide band control signal;
            a numerical information signal,
        the method further comprising transmitting said control signal and said information signal over said rectangular-wave signal modulated in combination with frequency modulation and pulse width modulation, wherein said control signal and said information signal are the modulating signals for frequency modulation and pulse width modulation of said rectangular-wave signal.

2. The power supply device of claim 1, further comprising:
a signal conditioning circuit coupled to the output of the optocoupler and comprising a current mirror with a first and a second transistor, wherein:
the first transistor is an active load for the output of the optocoupler to prevent saturation thereof,
the second transistor provides an output for the signal conditioning circuit which reproduces the optocoupler output, and
a high-pass equalizer is arranged between the first transistor and the second transistor of the current mirror.

3. The electrical power supply device of claim 1, wherein the electrical power supply device is further configured to:
modulate the frequency of said rectangular-wave signal with said control signal; and
modulate the pulse-width of said rectangular-wave signal with said information signal.

4. The electrical power supply device of claim 1, wherein the electrical power supply device is further configured to:
modulate the rectangular-wave signal as a two-level signal including signal intervals wherein the rectangular-wave signal assumes a first level over a first portion of the interval and a second level over a second portion of the interval, wherein the electrical power supply device is configured to modulate the frequency of the rectangular-wave signal by varying the duration of the signal intervals as a function of said control signal.

5. The electrical power supply device of claim 4, wherein the electrical power supply device is further configured to vary the rectangular-wave signal between a minimum frequency and a maximum frequency.

6. The electrical power supply device of claim 4, wherein the electrical power supply device is further configured to vary said frequency between a minimum frequency and a maximum frequency over a continuum of frequencies between said minimum frequency and said maximum frequency.

7. The electrical power supply device of claim 1, wherein the electrical power supply device is further configured to:
modulate the rectangular-wave signal as a two-level signal including signal intervals wherein the rectangular-wave signal assumes a first level over a first portion of the interval and a second level over a second portion of the interval, wherein the electrical power supply device is configured to modulate the pulse width of the rectangular-wave signal by varying the relative durations of the said first portion and said second portion of the signal interval as a function of the said information signal.

8. The electrical power supply device of claim 7, the electrical power supply device further configured to modulate the pulse width using:
two different values for said relative durations of said first portion and said second portion, wherein one bit of information is transmitted for each signal interval, or more than two different values for said relative durations of said first portion and said second portion, wherein more than one bit of information is transmitted for each signal interval.

* * * * *